Patented Feb. 11, 1941

2,231,844

UNITED STATES PATENT OFFICE 2,231,844

N-BASICALLY SUBSTITUTED COMPOUNDS OF THE HETEROCYCLIC SERIES

Hans Andersag and Stephan Breitner, Wuppertal-Elberfeld, Germany, assignors to Winthrop Chemical Company, Inc., New York, N. Y., a corporation of New York No Drawing. Application July 21, 1937, Serial No. 154,756. In Germany August 1, 1936

2 Claims. (Cl. 260—288)

This invention relates to N-basically substituted compounds of the heterocyclic series, more particularly to quinoline derivatives the benzene nucleus of which is condensed with a six-membered nucleus and the pyridine ring of which is substituted by a basically substituted amino group.

U. S. Patents Nos. 1,747,531 and 1,903,196 cover processes for the manufacture of amino quinolines and their substitution products which are basically substituted in the amino group. U. S. Patents Nos. 1,766,403, 1,760,781 and 1,889,704, furthermore cover processes for the manufacture of amino acridines which are basically substituted in the amino group, and U. S. application No. 94,876, U. S. Patent 2,082,171, U. S. applications Nos. 24,774 and 24,775 cover the manufacture of specific substitution products of N-basically substituted 9-amino-acridines. These acridine compounds are in a way quinoline derivatives in which the pyridine nucleus of the quinoline ring system is condensed with a benzene ring. The said compounds are distinguished by their action against blood parasites, especially malaria parasites.

The present invention is based on the further discovery that also 4-[1''-dialkylaminopentyl-(4'')-amino]-[benzo-1'.2':7.8-quinolines] which contain in 3-position hydrogen or a methyl group and in 6'-position hydrogen, halogen or a lower alkoxy group are distinguished by their action against blood parasites, in particular malaria parasites, and moreover, by their action against amoebae and worm infections. The above specified products are distinguished from the basically substituted amino acridine compounds by their colorlessness.

The compounds above specified are obtained by one process according to the invention by introducing the basic radical that is the 1-dialkyl-amino-pentyl-(4)-radical into the amino group of 4-amino-[benzo-1'.2':7.8-quinolines] which are substituted in the 3- and 6'-positions as specified before by reacting thereupon with a reactive ester of 1-dialkylamino-pentanols-(4), for instance their esters with hydrohalic acids or with sulfonic acids, or with their salts, or by condensing the 1-dialkyl-amino-pentanols-(4) themselves with the 4-amino [benzo-1'.2':7.8-quinolines] (compare Brit. spec. No. 433,625) in the presence of agents having a condensing action.

By a further process according to the present invention the above specified compounds are particularly readily obtained by replacing in [benzo-1'.2':7.8-quinolines], the 3- and 6'-positions of which are substituted as specified above and which are substituted in 4-position by substituents capable of being replaced, preferably halogen atoms, but also hydroxy, alkoxy and sulfonic acid groups, the substituent capable of being replaced by an 1-dialkylamino-pentyl-(4)-amine radical by the action of the said di-amine. The reaction may be facilitated by the addition of agents known for this purpose.

The invention is further illustrated by the following examples without being restricted thereto:

*Example 1.*—21.4 grams of 4-chloro-7.8-benzo-quinoline melting at 95° C. are heated with 40 grams of 5-diethylamino-2-amino-pentane for 8 hours at 180–190° C. The melt is taken up in ether with the addition of alkali and fractionally distilled. The 4-(5'-diethylaminopentyl-2'-amino)-7.8-benzoquinoline boils at 235–245° C. under 2 mm. pressure. The hydrochloride and acetate of the compound are readily soluble in water.

*Example 2.*—29.2 grams of 4-chloro-6'-bromo-(benzo-1'.2':7.8-quinoline) melting at 204° C. are heated with 32 grams of 5-diethylamino-2-amino-pentane for 15 hours at 180–190° C. and treated as indicated in Example 1. The 4-(5''-diethylaminopentyl - 2''-amino) -6'-bromo-(benzo-1'.2':7.8-quinoline) boils at 235–240° C. under 0.2 mm. pressure.

In a corresponding manner there are obtained: 4-(5''-diethylaminopentyl-2''-amino) - 6' - methoxy-(benzo-1'.2':7.8-quinoline) boiling at 230–235° C. under 0.5 mm. pressure from 4-chloro-6'-methoxy-(benzo-1'.2':7.8-quinoline) melting at 168° C. and 5-diethyamino-2-aminopentane.

*Example 3.*—11.4 grams of 3-methyl-4-chloro-(benzo-1'.2':7.8-quinoline) melting at 157° C. are heated with 20 grams of 1-diethylamino-4-amino-pentane in 40 grams of phenol for 8 hours to 180–190° C. The melt is extracted with dilute acetic acid, the neutral parts are removed by extraction with ether and treated with excess 30% caustic soda solution. The separated oil is extracted with ether, the solution dried over potassium carbonate and the solvent evaporated. The residue yields by fractional distillation the 3-methyl-4-(5''-diethylaminopentyl-2''-amino)-(benzo-1'.2': 7.8-quinoline) boiling at 240–242° C. under 0.2 mm. pressure.

We claim:

1. 4-(1''-[di-(lower alkyl)-amino]-pentyl-4''-amino)-[benzo-1'.2':7.8-quinolines], the 3-position of which is substituted by one of the substituents hydrogen and methyl and the 6'-position of which is substituted by one of the substituents hydrogen, halogen and lower alkoxy groups, prepared as a therapeutic remedy against blood parasites, in particular the asexual form of malaria parasite.

2. 3-methyl-4-(1″- diethylamino - pentyl - 4″ - amino)-(benzo-1′.2′:7.8-quinoline), boiling under 0.2 mm. pressure at 240–242° C., prepared as a therapeutic remedy against blood parasites, in particular the asexual form of malaria parasite.

HANS ANDERSAG.
STEPHAN BREITNER.